Patented Sept. 17, 1929

1,728,252

UNITED STATES PATENT OFFICE

FRANCIS G. RAWLING, OF MADISON, WISCONSIN

PROCESS FOR RECOVERING CHEMICALS

No Drawing.  Application filed February 4, 1927.  Serial No. 166,025.

This invention relates to a process for recovering chemicals from the waste materials produced in the pulping of wood. It pertains particularly to the recovery of sodium carbonate and sodium bicarbonate from the waste liquors resultant of the pulping of wood by compounds containing sodium and sulphur.

One of the chief objects of the invention is to recover sodium carbonate or sodium bicarbonate free from sodium sulphide.

One of the features of the invention is the treatment given to the ash obtained from concentrating and drying the waste liquors. It is noteworthy that the steps of the present invention may be used not only on the ash resultant from drying the above mentioned waste liquors, but also may be used for the ash obtained from the so-called sulphate pulping process.

In processes of pulping wood, in which wood chips are first softened by a chemical treatment at temperature above 100° C., by means of an aqueous solution of a combination of sodium sulphite and sodium carbonate or bicarbonate, and subsequent to the chemical treatment, the softened chips are completely pulped by mechanical means, the waste liquors from the chemical treatment of the wood are at present discarded. Such waste liquors contain a number of organic compounds, which are produced from that portion of the wood dissolved during the chemical treatment, the constitution of which is not fully known. These liquors, however, may be treated so that sodium bicarbonate or sodium carbonate may be recovered from them free from sodium sulphide. Since a solution of sodium bicarbonate decomposes more or less on heating to form sodium carbonate and carbon dioxide, which will recombine on cooling or under increased pressure to form sodium bicarbonate again, the proportions of sodium carbonate to sodium bicarbonate formed during the recovery process will vary according to the conditions under which the recovery takes place. The invention relates to the method of regenerating either of these sodium salts from the waste liquor, and may be practiced in the following manner.

The waste liquors are removed from the chemically treated wood or pulp and are evaporated so that they may be burned readily. Usually the liquor may be concentrated to a specific gravity in excess of 1.15, where the value 1.00 refers to the value of water. The concentrated waste liquors are burned to form an ash, which consists chiefly of sodium carbonate, sodium sulphide and carbon.

The ash is treated with a mixture of air, steam and carbon dioxide, or of air and steam alone, if the temperature of the ash is high enough to cause combustion of part of the carbon present in the ash. In the presence of steam, a reaction takes place, whereby the sodium sulphide in the ash is converted into sodium carbonate or even to sodium bicarbonate provided the treatment of the ash is made under pressure greater than atmospheric, in closed vessels. Reactions according to the following equations probably take place:

1. $Na_2S + CO_2 + H_2O = Na_2CO_3 + H_2S$

2. $Na_2S + 2CO_2 + 2H_2O = 2NaHCO_3 + H_2S$

3. $C + O_2 = CO_2$

4. $2H_2S + O = 2H_2O + 2S$

In Equation 3 the air interacts with the carbon in the ash provided the temperature is high enough, and in Equation 4 the air reacts with the sulphuretted hydrogen produced according to Equations 1 and 2, to form sulphur. Whenever the temperature is high enough for carbon in the ash to interact with the air according to Equation 3, the sulphur formed according to Equation 4 cannot exist as free sulphur, since it is readily combustible in air at temperatures at which carbon burns. Under these conditions the sulphur, in the presence of excess of air will form sulphur trioxide or sulphuric acid, since steam is present, part of which will react with sodium carbonate to produce sodium sulphate, remainder being lost as a fume in the effluent gases. Equation 4 represents the first step in the oxidation of sulphuretted hydrogen and the elimination of the sulphide radicle from the products of reaction in Equations 1 and 2. Not much evidence of the formation of sulphur dioxide has been detected, although it is likely to be formed under certain conditions, brought about by the form or construction of the vessels in which the reaction takes place. The treated ash consists mainly of sodium carbonate, sodium bicarbonate and carbon from which the sodium carbonate and bicarbonate may be removed by solution in water, leaving the carbon and small amounts of insoluble material, as a residue. Traces of sodium sulphide in the solution may be completely removed if necessary by treating the solution with carbon dioxide.

The temperature of the ash during treatment is necessarily at or above the temperature of steam at atmospheric or higher pressure under which the treatment may be conducted. The oxidation of the sulphuretted hydrogen causes an evolution of heat, whilst if the temperature of the ash is above the point at which the carbon commences to oxidize, a further evolution of heat is produced. Under the latter condition, by the use of sufficient air, the heat caused by the oxidation of the carbon may be sufficient to melt the ash. If necessary the temperature may be moderated in the well-known manner by the use of more steam so that the heat will be absorbed as the temperature of the steam rises. This is not detrimental to the desired treatment the object of which is the production of a solution of sodium carbonate substantially free from sulphides.

The same methods of treating the ash may be used for the treatment of the ash from the well known so-called sulphate pulping process, which is in extensive commercial operation, for the purpose of recovering sodium carbonate and bicarbonate free from sodium sulphide. The burning of the waste liquor and the smelting of the ash is well known and the present recovery practice makes use of the sodium sulphide for pulping purposes. The present invention aims at the removal of sodium sulphide which is harmful in other pulping processes, thus obtaining solutions free from this compound.

I claim:—

1. In the process of recovering a solution containing sodium carbonate and free from sodium sulphide from a waste liquor obtained from a process of pulping wood in which salts of sodium and sulphur are used, the steps of treatment to produce sodium carbonate which steps include concentrating the waste liquor, incinerating it to form an ash, treating the ash with a mixture of air and steam and carbon dioxide, and thereby converting the sodium sulphide to sodium carbonate and removing sulphuretted hydrogen, and dissolving the resultant ash in water.

2. In the process of recovering a solution containing sodium carbonate and free from sodium sulphide from a waste liquor obtained from a process of pulping wood in which salts of sodium and sulphur are used, the steps of treatment to produce sodium carbonate which steps include concentrating the waste liquor, incinerating it to form an ash, treating the ash with a mixture of air and steam and under temperature conditions sufficient to cause combustion of part of the carbon present in the ash, and thereby converting the sodium sulphide to sodium carbonate and removing sulphuretted hydrogen, and dissolving the resultant ash in water.

3. In the process of recovering a solution containing sodium carbonate and substantially free from sodium sulphide from a waste liquor obtained from a process of pulping wood in which salts of sodium and sulphur are used, the steps of treatment to produce sodium carbonate, which steps include concentrating the waste liquor, incinerating it to form ash, treating the ash with a mixture of air and steam and carbon dioxide and thereby eliminating the sodium sulphide from the ash, dissolving the resultant ash in water, and separating the solution from the unsoluble residue.

4. In the process of recovering a solution containing sodium carbonate and substantially free from sodium sulphide from a waste liquor obtained from a process of pulping wood in which salts of sodium and sulphur are used, the steps of treatment to produce sodium carbonate, which steps include concentrating the waste liquor, incinerating it to form an ash, treating the ash with a mixture of steam and carbon dioxide and thereby converting the sodium sulphide to sodium carbonate and removing sulphuretted hydrogen, dissolving the resultant ash in water, and separating the solution from the insoluble residue.

5. In the process of recovering a solution containing sodium carbonate and substantially free from sodium sulphide from a waste liquor obtained from a process of pulping wood in which salts of sodium and sulphur are used, the steps of treatment to produce sodium carbonate, which steps include concentrating the waste liquor, incinerating it to form an ash, treating the ash with a mixture of air and steam and carbon dioxide and thereby eliminating the sodium sulphide from the ash, oxidizing the sulphuretted hydrogen, dissolving the resultant ash in water, and separating the solution from the insoluble residue.

6. In the process of recovering a solution containing sodium carbonate and substantially free from sodium sulphide from a waste liquor obtained from a process of pulping wood in which salts of sodium and sulphur are used, the steps of treatment to produce sodium carbonate, which steps include concentrating the waste liquor, incinerating it to form an ash, treating the ash at temperatures above its ignition point with a mixture of air and steam and thereby eliminating the sodium sulphide from the ash, dissolving the resultant ash in water, and separating the solution from the insoluble residue.

7. In the process of recovering and regenerating a solution containing sodium carbonate and substantially free from sodium sulphide from a waste liquor obtained from a process of pulping wood in which salts of sodium and sulphur are used, the steps of treatment to produce sodium carbonate, which steps include concentrating the waste liquor, incinerating it to form an ash, treating the ash with a mixture of air and steam, at temperatures at which carbon in the ash combines with oxygen in the air to form carbon dioxide which reacts with the sodium sulphide in the presence of the steam thereby decomposing the sodium sulphide by eliminating therefrom the sulphide radicle, dissolving the resultant ash in water, and separating the solution from the insoluble residue.

8. In the process of recovering and regenerating a solution containing sodium carbonate and substantially free from sodium sulphide from a waste liquor obtained from a process of pulping wood in which salts of sodium and sulphur are used, the steps of treatment to produce sodium carbonate, which steps include concentrating the waste liquor, incinerating it to form an ash, treating the ash with a mixture of air and steam, at temperatures at which carbon in the ash combines with oxygen in the air to form carbon dioxide which reacts with the sodium sulphide in the presence of steam thereby decomposing and eliminating the sodium sulphide from the ash, oxidizing the sulphide radicle, dissolving the resultant ash in water, and separating the solution from the insoluble residue.

In testimony whereof I affix my signature.

FRANCIS G. RAWLING.